United States Patent [19]

Ohata et al.

[11] Patent Number: 5,672,661
[45] Date of Patent: Sep. 30, 1997

[54] ACRYLIC RUBBER COMPOSITION

[75] Inventors: Hiroyuki Ohata; Harukazu Okuda, both of Fukui-ken, Japan

[73] Assignee: Nissin Chemical Industry Co., Ltd., Fukui-ken, Japan

[21] Appl. No.: 610,544

[22] Filed: Mar. 6, 1996

[30] Foreign Application Priority Data

Mar. 8, 1995 [JP] Japan .................................. 7-048041

[51] Int. Cl.$^6$ ...................................................... C08L 33/04
[52] U.S. Cl. ........................ 525/288; 525/326.5; 524/264
[58] Field of Search ................................ 525/288, 326.5; 524/264

[56] References Cited

U.S. PATENT DOCUMENTS

| | | | |
|---|---|---|---|
| 3,646,155 | 2/1972 | Scott et al. | 525/288 |
| 3,647,891 | 3/1972 | Wheeler | 525/288 |
| 3,830,872 | 8/1974 | Schrage et al. | 525/288 |
| 4,761,452 | 8/1988 | Itoh et al. | 524/521 |
| 5,585,424 | 12/1996 | Ohata et al. | 524/264 |

*Primary Examiner*—Irina S. Zemel
*Attorney, Agent, or Firm*—McAulay Fisher Nissen Goldberg & Kiel, LLP

[57] ABSTRACT

Proposed is an acrylic rubber composition suitable for hot-air vulcanization under normal pressure with a greatly increased vulcanization velocity. The composition comprises:

(1) 100 parts by weight of an acrylic rubber polymer which is a copolymerization product of a monomer mixture consisting of
  (a) from 1 to 25% by weight of an alkoxy-substituted alkyl (meth)acrylate,
  (b) from 55 to 99% by weight of an alkyl (meth) acrylate, and
  (c) from 0 to 20% by weight of a third comonomer selected from several ethylenically unsaturated monomeric compounds;
(2) from 0.1 to 20 parts by weight of an alkoxy silane compound having an unsaturated group;
(3) from 10 to 200 parts by weight of a reinforcing filler; and
(4) from 0.1 to 10 parts by weight of an organic peroxide.

14 Claims, No Drawings

ACRYLIC RUBBER COMPOSITION

BACKGROUND OF THE INVENTION

The present invention relates to a novel acrylic rubber composition capable of being vulcanized under normal pressure in an atmosphere of hot air so as to be useful in a continuous process for molding and vulcanization of a rubber article with a greatly improved productivity as compared with conventional acrylic rubber compositions which can be molded and vulcanized only in a batchwise process under compression.

As is known, acrylic rubbers are widely used mainly as a material of automobile parts since an acrylic rubber is a synthetic rubber having excellent properties in the weatherability, resistance against ozone, heat resistance, oil resistance and so on. While the vulcanization velocity of an acrylic rubber composition depends mainly on the types of the functional groups in the rubber polymer molecules pertaining to the vulcanization reaction, the vulcanization velocity of a rubber composition based on an active halogen-containing acrylic rubber polymer is generally higher than that of an epoxy group-containing acrylic rubber but these acrylic rubber compositions are not suitable for hot-air vulcanization under normal pressure because of the intensive foaming due to the vaporization of the constituents having relatively high vaporizability to precede proceeding of vulcanization.

Further, proposals have been made in Japanese Patent Publications 2-1859 and 4-30963 for an acrylic rubber composition vulcanizable at a high speed in which vinyl-containing organosilicon groups are introduced into the acrylic rubber polymer molecules and in Japanese Patent Kokai 5-214196 for an acrylic rubber composition with an acrylic rubber polymer having alkoxy-substituted alkyl groups in combination with an organic peroxide. Although these acrylic rubber compositions can be vulcanized at a relatively high vulcanization velocity as compared with conventional compositions, they are still practically not suitable for hot-air vulcanization under normal pressure because microscopic foaming is unavoidable in the vulcanizate body obtained by the hot-air vulcanization and vulcanization is incomplete in the skin layer of a molded body due to the inhibiting effect of the atmospheric oxygen on the vulcanization reaction eventually to cause troubles that the incompletely vulcanized skin layer falls off when scratched with a finger nail or a pointed body. Although the adverse influence of the atmospheric oxygen on the vulcanization can of course be avoided and vulcanization can be complete even in the skin layer not to cause falling of the skin layer when vulcanization is conducted in an atmosphere of high temperature nitrogen, it is usually a very difficult matter to completely prevent leakage of nitrogen gas from the process apparatuses to cause a safety problem due to oxygen deficiency in the working environment which can be prevented only with a large amount of investment and high running costs. In addition, the acrylic rubber composition disclosed in the above mentioned Japanese Patent Kokai 5-214196 has a problem that the heat resistance of the vulcanizate thereof is remarkably decreased due to the high copolymerization ratio of an alkoxy-substituted alkyl (meth)acrylate.

SUMMARY OF THE INVENTION

The present invention accordingly has an object to provide a novel and improved acrylic rubber composition which can be molded and vulcanized by hot-air vulcanization under normal pressure in a continuous process so that a great improvement could be obtained in the productivity of vulcanized rubber articles as compared with batch-wise vulcanization processes under compression.

Thus, the acrylic rubber composition suitable for hot-air vulcanization under normal pressure provided by the present invention is a uniform blend which comprises:

(1) 100 parts by weight of an acrylic rubber polymer which is a copolymerization product of a monomer mixture consisting of
 (a) from 1 to 25% by weight of a first comonomer which is an alkoxy-substituted alkyl (meth)acrylate,
 (b) from 55 to 99% by weight of a second comonomer which is an alkyl (meth)acrylate, and
 (c) from 0 to 20% by weight of a third comonomer which is selected from the group consisting of styrene, vinyl toluene, α-methyl styrene, vinyl naphthalene, (meth)acrylic acid, (meth)acrylamide, 2-hydroxyethyl (meth)acrylate, glycidyl (meth) acrylate, allyl glycidyl ether, (meth)acrylonitrile, ethylene, propylene, vinyl chloride, vinyl acetate, vinyl monochloroacetate, 2-chloroethyl vinyl ether, divinyl benzene, allyl (meth)acrylate and butane diol di(meth)acrylate, the total amount of the first to third comonomers being 100%;

(2) from 0.1 to 20 parts by weight of an alkoxy silane compound having an ethylenically unsaturated group;
(3) from 10 to 200 parts by weight of a reinforcing filler; and
(4) from 0.1 to 10 parts by weight of an organic peroxide.

DETAILED DESCRIPTION OF THE PREFERRED EMBODIMENTS

As is described above, the essential ingredients in the inventive acrylic rubber composition are the components (1) to (4), of which the component (1) is a rubbery polymer which is a copolymer of three kinds of comonomers including (a) an alkoxyalkyl (meth)acrylate, i.e. acrylate and methacrylate, (b) an alkyl (meth)acrylate, and (c) an ethylenically unsaturated monomeric compound other than the comonomers (a) and (b) selected from the above specified ethylenically unsaturated compounds. The copolymerization reaction of these comonomers can be performed by a conventional procedure for radical polymerization.

The alkoxyalkyl (meth)acrylate as the comonomer (a) is represented by the general formula $CH_2=CR^1—CO—O—R^2—O—R^3$, in which $R^1$ is a hydrogen atom or a methyl group, $R^2$ is an alkylene group having 1 to 4 carbon atoms and $R^3$ is an alkyl group having 1 to 4 carbon atoms. Examples of suitable compounds as the comonomer (a) include 2-methoxyethyl (meth)acrylate, 2-ethoxyethyl (meth)acrylate, 3-ethoxypropyl (meth)acrylate, 2-propoxyethyl (meth)acrylate, 2-butoxyethyl (meth) acrylate and the like, though not particularly limitative thereto. These monomeric compounds can be used as the comonomer (a) either singly or as a combination of two kinds or more according to need. The comonomer (a) serves to introduce vulcanization sites into the acrylic rubber polymer. The amount of the comonomer (a) in the mixture of the comonomers (a) to (c) should be in the range from 1 to 25% by weight or, preferably, from 5 to 20% by weight. When the amount of the comonomer (a) is too small, the acrylic rubber composition compounded with such an acrylic polymer cannot exhibit a sufficient vulcanization velocity to cause a difficulty in the hot-air vulcanization under normal pressure while, when the amount thereof is too large, the heat resistance of the vulcanizate would be decreased.

The comonomer (b) is an alkyl (meth)acrylate represented by the general formula $CH_2=CR^1-CO-O-R^4$, in which $R^1$ has the same meaning as defined above and $R^4$ is an alkyl group having 1 to 9 carbon atoms. Examples of the alkyl (meth)acrylate suitable as the comonomer (b) include methyl (meth)acrylate, ethyl (meth)acrylate, butyl (meth) acrylate, hexyl (meth)acrylate, octyl (meth)acrylate, 2-ethylhexyl (meth)acrylate, nonyl (meth)acrylate and the like. These alkyl (meth)acrylate compounds can be used either singly or as a combination of two kinds or more according to need. The amount of the comonomer (b) as one of the principal constituents in the mixture of the comonomers (a) to (c) should be in the range from 55 to 99% by weight or, preferably, from 80 to 95% by weight.

The third comonomer, i.e. comonomer (c), is optional in the comonomer mixture and is selected from several kinds of monomeric compounds including styrene, vinyl toluene, α-methyl styrene, vinyl naphthalene, (meth)acrylic acid, (meth)acrylamide, 2-hydroxyethyl (meth)acrylate, glycidyl (meth)acrylate, allyl glycidyl ether, (meth)acrylonitrile, ethylene, propylene, vinyl chloride, vinyl acetate, vinyl monochloroacetate, 2-chloroethyl vinyl ether, divinyl benzene, allyl (meth)acrylate, butane diol di(meth)acrylate and the like.

The comonomer (c) is used in combination with the comonomers (a) and (b) with an object to impart the acrylic rubber composition or the vulcanizate thereof with a special property which cannot be obtained with the comonomers (a) and (b) alone. For example, an acrylic rubber polymer obtained by the copolymerization of a comonomer mixture including a monomer having a vulcanization site such as allyl glycidyl ether, vinyl monochloroacetate, 2-chloroethyl vinyl ether and the like has an additional advantage of improving the tensile strength and tear strength of the vulcanizate, which cannot be high enough by the vulcanization with an organic peroxide alone as the vulcanizing agent, when the inventive acrylic rubber composition is prepared by compounding with a combination of an organic peroxide and a specific vulcanizing agent suitable for epoxy groups and active chlorine atoms so that the vulcanization of the rubber composition proceeds in two steps including fie hot-air vulcanization under normal pressure and then vulcanization at the epoxy groups or active chlorine atoms as the vulcanization sites. Accordingly, the comonomer (c) is not essential in the mixture of the comonomers and the amount thereof can be zero or, when used, should not exceed 20% by weight of the comonomer mixture.

The component (2) in the inventive acrylic rubber composition is an alkoxysilane compound having an ethylenically unsaturated group in a molecule. Examples of such a silane compound include vinyl trimethoxy silane, vinyl triethoxy silane, hexen-5-yl trimethoxy silane, vinyl methyl dimethoxy silane, 3-vinyloxypropyl trimethoxy silane, 4-vinylphenyl trimethoxy silane, 3-methacryloxypropyl trimethoxy silane, 3-methacryloxypropyl triethoxy silane, 3-methacryloxypropyl methyl dimethoxy silane, 3-acryloxypropyl trimethoxy silane, 3-acryloxypropyl methyl dimethoxy silane, 3-(2-methacryloxyethyloxy) propyl trimethoxy silane and the like.

The amount of the unsaturated group-containing alkoxy silane compound as the component (2) in the inventive acrylic rubber composition is in the range from 0.1 to 20 parts by weight or, preferably, from 2 to 10 parts by weight per 100 parts by weight of the acrylic rubber polymer as the component (1). When the amount thereof is too small, the vulcanization-promoting effect expected of this component cannot be high enough to cause a difficulty in conducting hot-air vulcanization under normal pressure while, when the amount thereof is too large, the crosslinking density in the vulcanizate of the rubber composition is too high so that the vulcanizate has some brittleness and is not suitable for practical use.

The unsaturated group-containing alkoxy silane compound as the component (2) in the inventive acrylic rubber composition plays a role as a vulcanization accelerator when the acrylic rubber polymer as the component (1) is vulcanized by means of an organic peroxide as the component (4) of the rubber composition. It is an unexpected and quite surprising fact that the inventive rubber composition based on the alkoxy group-containing acrylic rubber polymer is rendered hot-air vulcanizable under normal pressure only by this accelerating effect of the component (2). Though not well understood, the mechanism for this unexpected advantageous phenomenon might be as follows.

As is known, particles of a reinforcing filler as the component (3) compounded in the rubber composition have functional groups such as silanol groups, carboxyl groups, phenolic hydroxy groups, quinone groups and the like on the surface. These functional groups react with the alkoxysilyl groups of the unsaturated group-containing alkoxysilane compound as the component (2) while the unsaturated groups of the unsaturated group-containing alkoxysilane compound pertain to the formation of crosslinks with the alkoxy group-containing acrylic rubber polymer as the component (1) in the vulcanization reaction by means of the organic peroxide as the component (4) resulting in establishment of linkages between rubber polymer molecules through the particles of the reinforcing filler. Namely, the vulcanization reaction in the inventive rubber composition proceeds in two different ways concurrently taking place including the conventional crosslink formation between the molecules of the rubber polymer and the above mentioned crosslink formation with intervention of the filler particles resulting in a great increase in the overall velocity of the vulcanization reaction so that vulcanization is complete before vaporization of the readily vaporizable constituents in the composition and the vulcanization inhibition by the atmospheric oxygen in the skin layer of the vulcanizate can be overcome to accomplish complete vulcanization enabling hot-air vulcanization under normal pressure.

The component (3) in the inventive acrylic rubber composition is a reinforcing filler which is exemplified by carbon blacks, dry-process fumed silica fillers and wet-process precipitated silica fillers synthesized from alkyl silicates, sodium silicates and the like. It is desirable that the reinforcing filler as the component (3) has a specific surface area of at least 30 $m^2/g$.

The amount of the reinforcing filler as the component (3) compounded in the inventive acrylic rubber composition is in the range from 10 to 200 parts by weight per 100 parts by weight of the acrylic rubber polymer. When the amount thereof is too small, the vulcanizate of the rubber composition cannot be imparted with practically high mechanical strengths due to deficiency of the reinforcing effect while, when the amount thereof is too large, difficulties are encountered in the compounding works in the preparation of the composition and in the molding works of the composition in addition to a decrease in the mechanical properties of the vulcanizate.

The component (4) in the inventive rubber composition is an organic peroxide which is desirably of a low temperature-decomposable type in order to obtain a high vulcanization velocity. In particular, those organic peroxides of which the half period of 1 minute is obtained at a temperature in the range from 100° to 160° C. are preferred. Examples of suitable organic peroxides include bis(2,4-dichlorobenzoyl) peroxide, bis(2-chlorobenzoyl) peroxide, bis(4-chlorobenzoyl) peroxide, dibenzoyl peroxide, 1,1-di-tert-butylperoxy-3,3,5-trimethyl cyclohexane and the like.

The amount of the organic peroxide as the component (4) compounded in the inventive acrylic rubber composition is in the range from 0.1 to 10 parts by weight per 100 parts by weight of the acrylic rubber polymer as the component (1). When the amount thereof is too small, the velocity of vulcanization cannot be sufficiently high so that the rubber composition is not suitable for hot-air vulcanization under normal pressure while, when the amount thereof is too large, the velocity of vulcanization would be so large that troubles are caused due to scorching and the vulcanizate would be poor in the mechanical properties with brittleness not to give a practical vulcanizate.

It is optional that the vulcanizing agent in the inventive rubber composition is a combination of the above described organic peroxide and a vulcanization accelerator such as triallyl isocyanurate, ethyleneglycol dimethacrylate, N,N'-m-phenylene bismaleimide and the like.

The acrylic rubber composition of the invention comprising the above described essential components (1) to (4) can be readily obtained by uniformly compounding together each a specified amount of the components in a suitable rubber-processing blending machine such as Banbury mixers, kneaders, intermixers, two-roll mills and the like. It is optional in this compounding work to subject the reinforcing filler as the component (3) to a preliminary treatment with the unsaturated group-containing alkoxy silane compound as the component (2). When the reinforcing filler is a finely divided silica filler, it is desirable that the blend before addition of the organic peroxide is subjected to a heat treatment at a temperature of 100° C. or higher to evaporate moisture contained therein because silica fillers more or less contain moisture adsorbed thereon from the atmosphere. Further, when the organic peroxide is of a low temperature-decomposable type, it is desirable that the organic peroxide is added to a blend of the other ingredients after the blend obtained at an elevated temperature has been cooled to a temperature of 70° C. or below by using a blending machine provided with a cooling means in order to prevent scorching of the composition under blending.

It is of course optional that the acrylic rubber composition of the invention is further admixed with various kinds of additives conventionally used in rubber compositions including non-reinforcing fillers such as metal oxides, e.g., titanium dioxide, zinc oxide and aluminum oxide, graphite powder, calcium carbonate, mica flakes, talc, quartz powder, diatomaceous earth, aluminum hydroxide, calcium silicate, magnesium silicate and the like, process oils, mold-release agents, coloring agents, flame retardants, dispersion aids and so on. It should, however, be noted that vulcanization of the composition would be incomplete not to give a practical vulcanizate unless admixture of the composition with an additive which may inhibit vulcanization of the rubber composition with the organic peroxide or, in particular, those compounds which exhibit a radical-scavenging activity such as amine-based aging retarders and ultraviolet absorbers is avoided or the amount of such additives is limited to a minimum amount.

The acrylic rubber composition of the invention prepared in the above described manner is molded in an extruder machine, calendering roller and the like followed by vulcanization under normal pressure by heating in a hot-air circulation oven and/or ultrahigh frequency induction oven to give a vulcanized rubber article in a continuous process at a very high productivity with industrial advantages. The rubber products which can be produced by the continuous vulcanization process include hoses, tubes, sheets, gaskets and the like.

In the following, the acrylic rubber composition of the invention is described in more detail by way of examples, in which the terms of "parts" and "%" always refer to "parts by weight" and "% by weight", respectively, excepting Table 1.

EXAMPLE 1

Into a polymerization vessel equipped with a stirrer, reflux condenser, thermometer and gas inlet tube were introduced 200 parts of deionized water which was heated up to 30° C. after flushing of the vessel with nitrogen followed by the addition of 0.2 part of ammonium persulfate and 0.2 part of a 1% aqueous solution of iron (II) sulfate to the vessel. Thereafter, an aqueous emulsion of monomers, which was separately prepared by emulsifying a mixture consisting of 10 parts, of 2-methoxyethyl acrylate, 130 parts of ethyl acrylate, 60 parts of butyl acrylate, 20 parts of a 10% aqueous solution of sodium lauryl sulfate, 40 parts of a 10% aqueous solution of polyethyleneglycol nonylphenyl ether having an HLB value of about 17, 0.1 part of sodium hydrogensulfite and 140 parts of deionized water by using a homomixer, was added to the mixture in the polymerization vessel under agitation drop-wise over a period of 3 hours at a constant rate and agitation of the mixture was continued at 30° C. for additional 1 hour so that the polymerization reaction was completed to give an aqueous emulsion of which the solid content was 33.0%. A 20% aqueous solution of sodium sulfate was added to the emulsion kept at 80° C. under agitation to destroy the emulsion followed by cooling and the precipitated polymer was collected, washed with water and dried to give 190 parts of an acrylic rubber polymer.

In the next place, a master blend of a rubber polymer was prepared by thoroughly blending 100 parts of the above obtained acrylic rubber polymer with 1 part of stearic acid, 1 part of an aging retarder (Nauguard 445, a product by Uniroyal Co.), 40 parts of a precipitated silica filler (Nipsil LP, a product by Nippon Silica Kogyo Co.) and 2 parts of 3-methacryloxypropyl trimethoxy silane in a pressurizable kneader followed by further continued mixing for 10 minutes at 130° C.

After cooling of the master blend to a temperature of 70° C. or below on a 8-inch two-roller mill under water-cooling, 100 parts of the master blend were thoroughly admixed with 4 parts of a pasty 1:1 mixture 2,4-di-chlorobenzoyl peroxide with a silica powder and 2 parts of N,N'-m-phenylene bismaleimide to give a vulcanizable rubber composition after deaeration by removing the included air. The rubber composition was molded into a 120 mm by 120 mm square sheet of 2 mm thickness which was vulcanized by heating at 200° C. for 5 minutes in an oven to give a vulcanized rubber sheet having good appearance of the surface and free from inclusion of voids. The rubber sheet was subjected to the measurement of mechanical properties as prepared and after aging at 150° C. for 70 hours according to the procedure specified in JIS K 6301 to give the results shown in Table 1 below.

EXAMPLE 2

The formulation and the polymerization procedure for the preparation of an acrylic rubber polymer were substantially the same as in Example 1 except that the amount of 2-methoxyethyl acrylate was increased to 30 parts, the amount of ethyl acrylate was decreased to 100 parts and 10 parts of allyl glycidyl ether were additionally added to the comonomer mixture.

A vulcanizable rubber composition was prepared in substantially the same formulation as in Example 1 excepting replacement of the acrylic rubber polymer with the same amount of the above prepared rubber polymer and replacement of 1 part of the aging retarder with 2 parts of another aging retarder (Irganox #1010, a product by Ciba-Geigy Co.) in the formulation of the master blend.

The results of the evaluation test of this rubber composition are shown also in Table 1. The vulcanized rubber sheet had good appearance and was free from voids likewise as in Example 1.

EXAMPLE 3

The formulation and the polymerization procedure for the preparation of an acrylic rubber polymer were substantially the same as in Example 2 except that the amount of ethyl acrylate was increased to 108 parts and 10 parts of allyl glycidyl ether were replaced with 2 parts of vinyl monochloroacetate.

A vulcanizable rubber composition was prepared in substantially the same formulation as in Example 1 excepting replacement of the acrylic rubber polymer with the same amount of the above prepared rubber polymer and replacement of 2 parts of 3-methacryloxypropyl trimethoxy silane with 4 parts of vinyl triethoxy silane in the formulation of the master blend.

The results of the evaluation test of this rubber composition are shown also in Table 1. The vulcanized rubber sheet had good appearance and was free from voids likewise as in Example 1.

EXAMPLE 4

The formulation and the polymerization procedure for the preparation of an acrylic rubber polymer were substantially the same as in Example 1 except that the comonomer mixture was composed of 20 parts of 2-ethoxyethyl methacrylate, 120 parts of ethyl acrylate, 50 parts of butyl acrylate and 10 parts of allyl glycidyl ether.

A vulcanizable rubber composition was prepared in substantially the same formulation as in Example 1 excepting replacement of the acrylic rubber polymer with the same amount of the above prepared rubber polymer and increase of the amount of the 3-methacryloxypropyl trimethoxy silane from 2 parts to 4 parts in the formulation of the master blend.

The rubber composition taken from the two-roll mill in the form of a ribbon was continuously extrusion-molded into the form of a string in a 20-Mm diameter extruder machine of L/D=15 equipped with a die of 5 mm diameter, which was driven at a velocity of 50 rpm keeping the barrel and the head at 40° C. and 60° C., respectively. The string of the rubber composition coming from the extruder machine was continuously introduced into and passed through a hot-air oven kept at 200° C. having an effective length of 750 cm at a velocity of 150 cm/minute to give a string of vulcanized rubber which had good appearance and was free from voids inside.

EXAMPLE 5

The formulation and the polymerization procedure for the preparation of an acrylic rubber polymer were substantially the same as in Example 1 except that the comonomer mixture was composed of 40 parts of 2-methoxyethyl acrylate, 100 parts of ethyl acrylate and 60 parts of butyl acrylate.

A vulcanizable rubber composition was prepared in substantially the same formulation as in Example 2 excepting replacement of the acrylic rubber polymer with the same amount of the above prepared rubber polymer, replacement of the silica filler with the same amount of a carbon black, FEF carbon, and increase of the amount of the 3-methacryloxypropyl trimethoxy silane from 2 parts to 6 parts in the formulation of the master blend.

The rubber composition was subjected to the evaluation test under the same conditions as in Example 4 to give substantially identical quite satisfactory results.

Comparative Example 1

The polymerization procedure for the preparation of an acrylic rubber polymer was substantially the same as in Example 1 except that the comonomer mixture was composed of 140 parts of ethyl acrylate and 60 parts of butyl acrylate.

A vulcanizable rubber composition was prepared in substantially the same manner as in Example 1 excepting replacement of the acrylic rubber polymer with the same amount of the above prepared rubber polymer in the preparation of the master blend.

The thus prepared rubber composition was subjected to the vulcanization test under the same conditions as in Example 1 for obtaining a 120 mm by 120 mm square sheet of 2 mm thickness but a good vulcanizate sheet could not be obtained with tackiness on the surface due to the low vulcanization velocity and inhibition of curing in the skin layer by the atmospheric oxygen. The rubber sheet was not suitable for the measurement of the mechanical properties due to occurrence of voids.

Comparative Example 2

The polymerization procedure for the preparation of an acrylic rubber polymer was substantially the same as in Example 1 except that the comonomer mixture was composed of 80 parts of 2-methoxyethyl acrylate, 60 parts of ethyl acrylate and 60 parts of butyl acrylate.

A vulcanizable rubber composition was prepared in just the same manner as in Comparative Example 1 excepting replacement of the acrylic rubber polymer with the same amount of the above prepared rubber polymer in the preparation of the master blend.

The thus prepared rubber composition was subjected to the evaluation tests in the same manner as in Example 1 to give the results shown in Table 1, according to which the vulcanized rubber sheet exhibited a low elongation and was poor in the heat resistance although the sheet had good appearance and was free from voids.

Comparative Example 3

The experimental procedure was just the same as in Example 1 excepting omission of the 3-methacryloxypropyl trimethoxy silane in the formulation of the master blend of the acrylic rubber polymer. The results of the vulcanization test were that voids were found in the vulcanized sheet of which the surface had tackiness.

Comparative Example 4

The experimental procedure was just the same as in Example 1 excepting an increase of the amount of 3-methacryloxypropyl trimethoxy silane from 2 parts to 30 parts in the formulation of the master blend of the acrylic rubber polymer. The results of the vulcanization test were that the hardness of the vulcanized sheet was too high with low elongation and brittleness.

TABLE 1

|  | Example | | | Comparative Example |
|---|---|---|---|---|
|  | 1 | 2 | 3 | 2 |
| As prepared | | | | |
| Hardness, JIS A | 58 | 60 | 60 | 62 |
| Tensile strength, kgf/cm$^2$ | 101 | 110 | 106 | 118 |
| Ultimate elongation, % | 270 | 240 | 260 | 130 |
| 100% modulus, kgf/cm$^2$ | 33 | 48 | 39 | 73 |
| Increment after aging | | | | |
| Hardness, points | +6 | +5 | +2 | +10 |
| Tensile strength, % | +4.0 | +4.5 | +1.8 | +3.4 |
| Ultimate elongation, % | −11 | −17 | +3.5 | −31 |
| Permanent compression set, %, after 70 hours at 100° C. | 24 | 21 | 17 | 22 |

What is claimed is:

1. An acrylic rubber composition suitable for hot-air vulcanization under normal pressure which comprises, as a uniform blend:
   (1) 100 parts by weight of an acrylic rubber polymer which is a copolymerization product of a monomer mixture consisting of
      (a) from 1 to 25% by weight of a first comonomer which is an alkoxy-substituted alkyl (meth)acrylate,
      (b) from 55 to 99% by weight of a second comonomer which is an alkyl (meth)acrylate, and
      (c) from 0 to 20% by weight of a third comonomer which is selected from the group consisting of styrene, vinyl toluene, α-methyl styrene, vinyl naphthalene, (meth)acrylic add, (meth)acrylamide, 2-hydroxyethyl (meth)acrylate, glycidyl (meth)acrylate, allyl glycidyl ether, (meth)acrylonitrile, ethylene, propylene, vinyl chloride, vinyl acetate, vinyl monochloroacetate, 2-chloroethyl vinyl ether, divinyl benzene, allyl (meth)acrylate and butane diol di(meth)acrylate,
      the total amount of the first to third comonomers being 100%;
   (2) from 0.1 to 20 parts by weight of an alkoxy silane compound having an ethylenically unsaturated group in the molecule;
   (3) from 10 to 200 parts by weight of a reinforcing filler; and
   (4) from 0.1 to 10 parts by weight of an organic peroxide.

2. The acrylic rubber composition as claimed in claim 1 in which the amount of the comonomer (a) in the monomer mixture is in the range from 5 to 20% by weight.

3. The acrylic rubber composition as claimed in claim 1 in which the amount of the comonomer (b) in the monomer mixture is in the range from 80 to 95% by weight.

4. The acrylic rubber composition as claimed in claim 1 in which the comonomer (a) in the monomer mixture is selected from the group consisting of 2-methoxyethyl (meth)acrylate, 2-ethoxyethyl (meth)acrylate, 3-ethoxypropyl (meth)acrylate, 2-propoxyethyl (meth)acrylate and 2-butoxyethyl (meth)acrylate.

5. The acrylic rubber composition as claimed in claim 4 in which the comonomer (a) in the monomer mixture is 2-methoxyethyl acrylate or 2-ethoxyethyl methacrylate.

6. The acrylic rubber composition as claimed in claim 1 in which the comonomer (b) in the monomer mixture is selected from the group consisting of methyl (meth)acrylate, ethyl (meth)acrylate, butyl (meth)acrylate, hexyl (meth)acrylate, octyl (meth)acrylate, 2-ethylhexyl (meth)acrylate and nonyl (meth)acrylate.

7. The acrylic rubber composition as claimed in claim 6 in which the comonomer (b) in the monomer mixture is ethyl acrylate or butyl acrylate.

8. The acrylic rubber composition as claimed in claim 1 in which the comonomer (c) in the monomer mixture is selected from the group consisting of allyl glycidyl ether, vinyl monochloroacetate and 2-chloroethyl vinyl ether.

9. The acrylic rubber composition as claimed in claim 8 in which the comonomer (c) in the monomer mixture is allyl glycidyl ether or vinyl monochloroacetate.

10. The acrylic rubber composition as claimed in claim 1 in which the ethylenically unsaturated group in the component (2) is a vinyl group or methacryloxy group.

11. The acrylic rubber composition as claimed in claim 1 in which the component (2) is selected from the group consisting of vinyl trimethoxy silane, vinyl triethoxy silane, hexen-5-yl trimethoxy silane, vinyl methyl dimethoxy silane, 3-vinyloxypropyl trimethoxy silane, 4-vinylphenyl trimethoxy silane, 3-methacryloxypropyl trimethoxy silane, 3-methacryloxypropyl triethoxy silane, 3-methacryloxypropyl methyl dimethoxy silane, 3-acryloxypropyl trimethoxy silane, 3-acryloxypropyl methyl dimethoxy silane and 3-(2-methacryloxyethyloxy) propyl trimethoxy silane.

12. The acrylic rubber composition as claimed in claim 11 in which the component (2) is 3-methacryloxypropyl trimethoxy silane or vinyl triethoxy silane.

13. The acrylic rubber composition as claimed in claim 1 in which the component (3) is a finely divided silica filler or carbon black having a specific surface area of at least 30 m$^2$/g.

14. The acrylic rubber composition as claimed in claim 1 in which the organic peroxide as the component (4) has a half life period of 1 minute for thermal decomposition at a temperature in the range from 100° to 160° C.

* * * * *